United States Patent [19]
Berni et al.

[11] 4,084,027
[45] Apr. 11, 1978

[54] PROCESS FOR IMPARTING DURABLE FLAME-RETARDANCY TO COTTON-POLYESTER BLENDED TEXTILES

[75] Inventors: Ralph J. Berni, Metairie; Marilyn M. Smith; Ruth R. Benerito, both of New Orleans, all of La.

[73] Assignee: The United States of America as represented by the Secretary of Agriculture, Washington, D.C.

[21] Appl. No.: 794,594

[22] Filed: May 6, 1977

[51] Int. Cl.² .......................... C09D 5/18; C09K 3/28
[52] U.S. Cl. ................................ 427/390 D; 252/8.1; 428/276; 428/277; 428/280; 428/290; 428/921
[58] Field of Search .................. 427/390 D; 252/8.1; 106/15 FP; 260/DIG. 24; 8/116 P; 428/921, 276, 277, 280, 290

[56] References Cited

U.S. PATENT DOCUMENTS

| | | | |
|---|---|---|---|
| 3,746,572 | 7/1973 | Weil et al. | 427/390 D |
| 3,975,560 | 8/1976 | Daigle et al. | 427/390 D |
| 4,026,711 | 5/1977 | Weyker et al. | 106/15 FP |
| 4,027,062 | 5/1977 | Engelbrecht et al. | 428/921 X |

*Primary Examiner*—Harry J. Gwinnell
*Attorney, Agent, or Firm*—M. Howard Silverstein; David G. McConnell; Salvador J. Cangemi

[57] ABSTRACT

Stable oil and water emulsions, prepared such that a water-soluble phosphorus monomer, a melamine-formaldehyde resin, and an emulsifier of high HLB value are in the water phase while an oil soluble halogenated phosphate and emulsifier of low HLB value are in a chlorinated solvent, can be used to impart durable-to-laundering flame retardancy to both cotton and cotton-polyester textiles provided the HLB value of the final emulsion is greater than 9 and not over 15.1.

6 Claims, No Drawings

PROCESS FOR IMPARTING DURABLE FLAME-RETARDANCY TO COTTON-POLYESTER BLENDED TEXTILES

BACKGROUND OF THE INVENTION

1. Field of the Invention

This invention relates to the art of treating cellulosic-polyester blended materials. More particularly, it relates to improving the flame resistance of cotton-polyester blended textiles.

2. Description of the Prior Art

The processes of the prior art utilize the same fire retardant reagents employed in this invention; however, these are applied separately in aqueous and nonaqueous treatments for cotton and polyester textiles, respectively. The processes of the prior art are limited by the lack of solubility of all the reagents in either water or chlorinated organic solvents, which are used to penetrate and swell cotton or polyester fibers, respectively. The water-soluble phosphorus derivative, in combination with water soluble methylol melamine, and urea, has been successfully used to produce durable flame retardancy to all cotton textiles. The water-insoluble tris(2,3-dibromopropyl) phosphate has been used to impart durable flame retardancy to all cotton textiles. The water-insoluble tris(2,3-dibromopropyl) phosphate has been used to produce durable flame retardant polyester fabrics (ref. Textile Chemist & Colorist 4, pp 71–76, 1972).

The use of tris(2,3-dibromopropyl)phosphate in a commercially available "Self-emulsifiable" form in combination with water-soluble reagents is common knowledge, but such a combination only has a shelf life of less than one week.

SUMMARY OF THE INVENTION

Durable flame retardancy is imparted simultaneously to cotton and polyester fibers in cotton-polyester blended textiles by application of an improved chlorinated hydrocarbon in water emulsion containing water soluble reagents usually applied to flame retard cotton and water insoluble reagents usually applied to flame retard polyester fiber. The emulsion formulation must contain critical proportions of selected emulsifiers; the aqueous phase must contain an emulsifier of HLB number of at least 14 and the chlorinated hydrocarbon phase must contain an emulsifier of HLB number of 9 or less; and the two phases must be carefully blended to result in an HLB number about from 9.6 to 15.1. The ratio of weight of waterphase to weight of chlorinated hydrocarbon must be from about 3:1 to 2:1.

The main object of the present invention is to provide a process for simultaneously applying water soluble flame retardants based on phosphorus and nitrogen to hydrophilic cotton and water insoluble flame retardants based on halogens to hydrophobic polyester by use of a system that allows for this simultaneous, homogeneous distribution of water soluble and chlorinated hydrocarbon soluble flame retardant reagents throughout the cotton and polyester fibers, respectively.

The selection of emulsifiers was based on what is commonly called a "Hydrophilic-Lypophilic Balance" (HLB value) [Ref. "The Atlas HLB System," Atlas Chemical Industries, Inc., Wilmington, Del. (1963)] such that a solute soluble in one phase only can be dispersed homogeneously in a second solvent phase.

DESCRIPTION OF THE PREFERRED EMBODIMENTS

In the preferred practice of the present invention, the emulsions include the following ingredients: an emulsifying reagent of HLB number about from 14.0 to 15.6 in the aqueous phase and an emulsifying reagent of HLB number about from 6.7 to 9.0 in the perchloroethylene (oil) phase such that the final emulsion when carefully blended has an HLB number about from 9.6 to 15.1; however, trichloroethylene, 1,1,1-trichloroethane or any of a number of chlorinated hydrocarbon solvents may be employed in the oil phase. The ratio of weight of water phase to weight of chlorinated hydrocarbon must be about from 3:1 to 2:1.

Further, the invention can best be described as an improved emulsion system containing on a weight basis about from 17% to 21% of a water soluble phosphorus-nitrogen derivative, about from 3.0 to 9.0% of a water soluble methylolated melamine, and about from 0.64 to 1.88 of a hydrophilic emulsifying reagent of HLB number about from 14.0 to 15.6, and about from 40 to 45% water as components of the water phase that is vigorously blended with an oil phase that contains about from 10% to 21% of a halogenated phosphate, about from 0.12 to 1.36 of a hydrophobic emulsifying reagent of HLB number from 6.7 to 9.0, and about 16% to 25% of a chlorinated hydrocarbon solvent. The use of the hydrophilic and hydrophobic type emulsifying reagents of HLB values ranging from 14–15.6 and 6.7 to 9.0, respectively, is critical to the stability of the final emulsion of HLB number about from 9.6 to 15.1. As can be seen, the combined high and low HLB number emulsifying agent concentration does not exceed 2% of the total formulation by weight. The ratio of high HLB number to low HLB number is about from 2.1:1 to 15.6:1, respectively.

The phosphorus derivatives applicable to the formulations of this invention are tetrakis (hydroxymethyl)phosphonium chloride (THPC) and its neutralization adducts such as tetrakis (hydroxymethyl)phosphonium hydroxide, -oxylate, -citrate, -phosphate, and the like, that impart flame retardancy to cotton. Urea and N-methylolated ureas are used to react with THPC reagent so that some nitrogen becomes part of the polymer finish, while N-methylolated melamines are used to make the polymer and an unreacted tris(2,3-dibromopropyl)phosphate in the cotton-polyester blended textile more durable to laundering. Any of a number of methylolated melamines can be used; more particularly, trimethylolated melamine (TMM) is preferred. Sodium hydroxide is added to help neutralize the THPC, but any strong base could be used, including potassium or calcium hydroxide or tetramethyl-, ethyl-, propyl-, or butyl-ammonium hydroxides. The water insoluble halogenated reagent can be any of a number of hydrocarbon phosphate type compounds, including tris(2,3-dibromopropyl)phosphate and phosphates containing mixtures of brominated and chlorinated species known to impart flame retardancy to polyester fibers and/or fabrics.

Chlorinated hydrocarbon solvents which may be used in the process of the present invention include any of the commercially available chlorinated hydrocarbons sufficiently volatile to be easily removed from the fabric and recycled for further use. Particularly suitable solvents include perchloroethylene; trichloroethylene, trichloroethane, and 1,1,1-trichloroethane.

Suitable emulsifying reagents in the present process include the hydrophilic polyoxyethylene sorbitan lauric-, palmitic-, stearic-, oleic-acid esters and the like used in conjunction with the lipophilic (hydrophobic) sorbitan lauric-, palmitic-, stearic-, and oleic-acid esters. Any of a number of commercially available hydrophilic and hydrophobic emulsifying agents can be used, but must be used in pairs such that the HLB numbers range from 14 to 15.6 and 6.7 to 9.0, respectively, so that the final emulsion HLB number ranges from 9.6 to 15.1 in order to ensure emulsion stability.

The versatility of the system is demonstrated by the fact that substantially any textile auxiliary such as softeners, dyes, defoamants, etc. which are soluble in water or chlorinated hydrocarbon solvents and which are usually employed in small concentrations can be added to give further desirable textile properties without destroying the stability of the emulsion. In fact, auxiliary reagents for both cotton and polyester fibers can be incorporated simultaneously into a stable emulsion. The system allows for the finishing of textiles via equipment common to most textile plants.

The following examples are provided to illustrate the invention in its preferred embodiments and should not be construed as limiting the invention.

EXAMPLE 1

A cotton-polyester 50—50 blended flannelette sample weighing 19 g was padded twice to 95% wet pickup with 250 g of an emulsion of the following compositions:

| (1) The Water Phase: | |
|---|---|
| Component | Percent by Weight of Final Emulsion |
| THPC | 19.0 |
| Urea | 5.2 |
| TMM* | 3.5 |
| NaOH | 3.2 |
| H$_2$O | 42.9 |
| Tween 40** | 1.0 |

| (b) The Oil Phase: | |
|---|---|
| Tris(2,3 dibromopropyl) Phosphate | 18.4 |
| Perchloroethylene | 6.1 |
| Span 40** | 0.7 |

*TMM refers to trimethylolated melamine.
**Tween and Span 40 are commercially available emulsifiers and are principally polyethylene sorbitol palmitic acid ester and sorbitol palmitic acid ester, respectively.

The two phases were prepared separately and then stirred in a Waring Blendor for 2 minutes at high speed setting.

The impregnated fabric was cured at 180° C for 2 minutes, rinsed in hot tap water for 15 minutes, soaked in 3% hydrogen peroxide solution for 30 minutes, rinsed in cold tap water for 5 minutes, and then dried in a forced draft oven at 60° C for 7 minutes. Each sample was allowed to equilibrate overnight before being weighed, tested, and analyzed. The treated fabric had a weight gain of 39.3%, and nitrogen, phosphorus, and bromine contents, respectively of 3.4%, 3.0%, and 6.8%. The char length before laundering was 0.9 inch, as compared to 10 inches for an untreated control fabric; the oxygen index (OI) value before laundering was 32.4% compared to a control value of 21.3%. The breaking strength retained was 107% of the original value or 30.9 pounds, compared to a untreated fabric of 28.9 pounds. After 20 AATCC home launderings the char length was 2.3 inches while the OI value was 28.0%. After 50 home launderings the char length was 3.2 inches and the OI value was 26.7%. The char length evaluation was done by the Department of Commerce FF 3-71 procedure. The 3.2 inches figure is acceptable in evaluating a durable flame retardant treatment for sleepwear. The breaking strength after 50 home launderings was still 96.5% of the original control value.

Durable flame retardancy is defined as the ability of a treated fabric to pass the Department of Commerce DOC FF 3-71 test after 50 home launderings without bleach.

A char length of less than 7 inches after 50 launderings will pass the DOC FF 3-71 Test. Oxygen Index values of greater than 26% are acceptable for cotton-polyester blended fabrics.

The emulsions prepared by the formulations of this invention were allowed to stand for 2 weeks and found to be without separation of layers. This is a suitable shelf life for these emulsions.

In comparison to the emulsions of the present invention, the use of self-emulsifiable, commercially available tris(2,3-dibromopropyl)phosphate formulation resulted in separation after a few days.

EXAMPLE 2

Another blended fabric sample was treated as in Example 1 with the exception that the fabric was 65% cotton and 35% polyester and the cure time was 3 min. with the following results:

| | % Add-on | % N | % P | % Br. | Char Len. | % OI | % Ret. Brk.Str. |
|---|---|---|---|---|---|---|---|
| Unlaundered | 36.9 | 3.8 | 3.2 | 6.7 | 1.3 | 33.5 | 75.1 |
| 20 Home Launderings | 36.8 | 3.8 | 2.7 | 1.2 | 3.9 | 28.3 | — |
| 50 Home Launderings | 38.5 | 3.9 | 3.1 | 0.9 | 3.8 | 27.9 | 70.0 |

EXAMPLE 3

Another blended fabric sample was treated as in Example 1 with the exception that tris(halogenated propyl)phosphate was used instead of tris(2,3 dibromopropyl)phosphate. The following results were obtained: Add-on, 31.0; %N, 3.3; %P, 2.7; %Br, 3.2; %Cl, 1.6; char length in inches, 2.2; and % Oxygen Index, 30.1, indicating excellent flame retardant properties.

EXAMPLE 4

A series of five cotton-polyester blend fabric samples were treated as in Example 1 with the exception that the ratio of emulsifying reagents (Tween 40/Span 40) were varied, in order to vary the final HLB Number of the emulsions and cure time was 3 minutes in every instance. All ratios within this range gave stable emulsions and fabrics treated with these emulsions exhibited durable flame retardancy as shown by their char lengths of less than 7 inches after 50 launderings. Results are shown in the following table.

| Sample No. | % Tween 40 | % Span 40 | HLB No. | % Gain | % N | % P | % Br | Char Len. (in.) | % OI |
|---|---|---|---|---|---|---|---|---|---|
| A | 32 | 68 | 9.55 | 39.0 | 3.6 | 3.2 | 7.0 | 1.3 | 32.0 |
| B | 52 | 48 | 11.32 | 37.9 | 3.5 | 3.0 | 5.8 | 1.9 | 31.4 |
| C | 72 | 28 | 13.08 | 36.8 | 3.4 | 2.9 | 6.6 | 1.5 | 31.7 |
| D | 87 | 13 | 14.47 | 37.1 | 3.4 | 2.9 | 6.0 | 1.3 | 31.6 |

-continued

| Sample No. | % Tween 40 | % Span 40 | HLB No. | % Gain | %N | %P | %Br | Char Len. (in.) | %OI |
|---|---|---|---|---|---|---|---|---|---|
| E | 94 | 6 | 15.10 | 36.1 | 3.5 | 3.0 | 5.6 | 1.4 | 31.6 |

EXAMPLE 5

TO ILLUSTRATE THE CRITICALLITY OF THE FINAL HLB NUMBER OF THE MIXED EMULSION SYSTEM:

Emulsions A, B, and C were prepared as in Example 4 and pertinent data was tabulated thusly:

| Emulsion | (% Tween 40) | (% Span 40) | HLB No. |
|---|---|---|---|
| A | 0 | 100 | 6.7 |
| B | 13 | 87 | 7.9 |
| C | 100 | 0 | 15.6 |

Emulsions A and B resulted in an intractable mass which could not be used in fabric preparation. Emulsion C padded onto a fabric gave acceptable results, as follows:

| Emulsion | % Wt. Gain | %N | %P | %Br | Char | %OI |
|---|---|---|---|---|---|---|
| C | 25.4 | 2.0 | 2.5 | 4.0 | 3.2 | 28.9 |

However, emulsion C showed decreased stability upon standing and lower add-ons, as compared to the preferred emulsions of Example 4.

We claim:

1. A method of applying flame retardant water-soluble phosphorus and nitrogen containing compounds and water-insoluble halogenated flame retardant compounds to a cotton-polyester fabric, the method comprising:
   (a) incorporating an emulsifying agent of high Hydrophilic-Lypophilic Balance (HLB) Number of at least 14, in the aqueous phase of an aqueous phase-hydrocarbon phase two phase system, and an emulsifying agent of low HLB Number of 9 or less in the chlorinated hydrocarbon phase, thus providing a stable emulsion of HLB Number of about from 9.6 to 15.1, wherein the ratio of aqueous phase to chlorinated hydrocarbon phase is about from 3:1 to 2:1, said stable emulsion having a suitable shelf life for finishing simultaneously the cotton and the polyester fiber when the final emulsion contains, respectively, the phosphorus and nitrogen flame retardants in the water phase and the halogenated flame retardant in the water-insoluble phase;
   (b) impregnating the fabric with said stable emulsion; and
   (c) curing the impregnated fabric.

2. The method of claim 1 wherein the combined high and low HLB number emulsifying agent concentration does not exceed 2% of the total formulation by weight.

3. The method of claim 1 wherein the ratio of high HLB number emulsifying agent to low HLB number emulsifying agent is about from 2.1:1 to 15.6:1, respectively.

4. The method of claim 2 wherein the high number emulsifying agent is selected from the group consisting of:
   polyoxyethylene sorbitan lauric acid ester,
   polyoxyethylene sorbitan palmitic acid ester,
   polyoxyethylene sorbitan stearic acid ester, and
   polyoxyethylene sorbitan oleic acid ester.

5. The method of claim 2 wherein the low HLB number emulsifying agent is selected from the group consisting of:
   sorbitan lauric acid ester,
   sorbitan palmitic acid ester,
   sorbitan stearic acid ester, and
   sorbitan oleic acid ester.

6. The method of claim 2 wherein the chlorinated hydrocarbon is selected from the group consisting of:
   perchloroethylene
   trichloroethylene,
   trichloroethane, and
   1,1,1-trichloroethane.

* * * * *